(12) United States Patent
Wilkinson et al.

(10) Patent No.: US 7,012,622 B2
(45) Date of Patent: Mar. 14, 2006

(54) PORTABLE OPERATING ENVIRONMENT FOR INFORMATION DEVICES

(75) Inventors: Tim Wilkinson, Berkeley, CA (US); Peter Mehlitz, El Cernto, CA (US)

(73) Assignee: Twin Communications of America, Inc., San Jose, CA (US)

( * ) Notice: Subject to any disclaimer, the term of this patent is extended or adjusted under 35 U.S.C. 154(b) by 0 days.

(21) Appl. No.: 09/931,576

(22) Filed: Aug. 14, 2001

(65) Prior Publication Data
US 2002/0070951 A1   Jun. 13, 2002

Related U.S. Application Data

(60) Provisional application No. 60/225,569, filed on Aug. 14, 2000.

(51) Int. Cl.
G09G 5/02 (2006.01)

(52) U.S. Cl. ...................................... 345/629; 345/619

(58) Field of Classification Search ................ 345/629, 345/619, 790, 764
See application file for complete search history.

(56) References Cited

U.S. PATENT DOCUMENTS

| | | | |
|---|---|---|---|
| 5,339,392 A * | 8/1994 | Risberg et al. ............. 345/762 |
| 5,388,200 A | 2/1995 | McDonald et al. |
| 5,604,857 A * | 2/1997 | Walmsley .................... 345/473 |
| 5,613,122 A | 3/1997 | Burnard et al. |
| 5,668,997 A | 9/1997 | Lynch-Freshner et al. |
| 5,729,669 A | 3/1998 | Appleton |
| 5,742,749 A | 4/1998 | Foran et al. |
| 5,764,228 A * | 6/1998 | Baldwin ..................... 715/797 |
| 5,838,334 A * | 11/1998 | Dye ........................... 345/503 |
| 5,864,342 A | 1/1999 | Kajiya et al. |
| 5,867,166 A | 2/1999 | Myhrvold et al. |
| 5,870,097 A | 2/1999 | Snyder et al. |
| 5,977,977 A * | 11/1999 | Kajiya et al. ................ 345/418 |
| 6,016,145 A | 1/2000 | Horvitz et al. |
| 6,020,894 A * | 2/2000 | Silverbrook ................ 345/619 |
| 6,023,275 A | 2/2000 | Horvitz et al. |
| 6,081,270 A | 6/2000 | Berry et al. |
| 6,151,034 A * | 11/2000 | Jain et al. .................... 345/503 |
| 2001/0034770 A1 * | 10/2001 | O'Brien ...................... 709/212 |
| 2002/0070951 A1 * | 6/2002 | Wilkinson et al. .......... 345/629 |
| 2002/0145611 A1 * | 10/2002 | Dye et al. ................... 345/543 |
| 2003/0122815 A1 * | 7/2003 | Deering ...................... 345/419 |

OTHER PUBLICATIONS

IEEE Visualization Proceedings of the conference on Visualization '99: celebrating ten years table of contents San Francisco, California, United States pp.: 215-223 Year of Publication: 1999 ISBN:0-7803-5897.*

(Continued)

Primary Examiner—Almis R. Jankus
Assistant Examiner—J. Amini
(74) Attorney, Agent, or Firm—Townsend and Townsend and Crew LLP

(57) ABSTRACT

A graphics rendering software program for use on an embedded computing device includes an application layer, a graphics toolkit, and a graphics driver for rendering a plurality of drawing surfaces, including a first drawing surface and a second drawing surface, on a display of the embedded computing device. The graphics driver is configured to render the first drawing surface at least partially overlapping the second drawing surface on the display. When the first drawing surface is rendered as partially overlapping the second drawing surface, a visible portion of the second drawing surface is computed as a set of rectangular clip segments.

22 Claims, 16 Drawing Sheets

OTHER PUBLICATIONS

International Conference on Computer Graphics and Interactive Techniques Proceedings of the 27th annual conference on Computer graphics and interactive techniques table of contents pp.: 443-454 Year of Publication: 2000 ISBN: 1-58113-208-5.*

Proceedings of the 1999 IEEE symposium on Parallel visualization and graphics table of contents San Francisco, California, United States pp.: 79-88 Year of Publication: 1999 ISBN:1-58113-237-9.*

* cited by examiner

PORTABLE OPERATING ENVIRONMENT FOR INFORMATION DEVICES

PRIORITY

This application claims the benefit of priority to U.S. provisional patent application No. 60/225,569, filed Aug. 14, 2000.

BACKGROUND OF THE INVENTION

1. Field of the Invention

The invention relates to software architectures for networked computing devices, which are operated in heterogenous network environments and are able to adapt to varying content types.

2. Discussion of the Related Art

Today, most operating environments are still focused on general purpose desktop computers, and are tightly coupled to their underlying operating systems, a typical example being Microsoft Windows. For certain information device categories, there exist specialized environments like Epoch (cell phones) and Palm OS (Palm PDAs). Several technologies exist which can be utilized in different, cross-platform environments (e.g. Personal Java VMs). These systems so far do not provide the desire degree of:

portability (different HW architectures)
scalability (different speed, memory, formfactors)
integration (no redundant components, functions)
extensibility (update/install of SW components via network to adapt to new content types)

for coping with today's rapidly changing device categories and content types. In particular, large device vendors are sought after for a common software infrastructure which is flexible enough to serve the needs of very different, special purpose, and usually resource-constrained devices.

Most existing drivers focus on expensive desktop-oriented windowing systems (Windows, X etc.), and accelerated display hardware. Consequently, these drivers have a high degree of runtime configurability (color depth, screen resolution), and use a design which assumes that most performance critical functions can be offloaded to special purpose hardware (bit block transfers, line drawing etc.). Inherently, such a design exhibits a considerable amount of indirection (functions called via pointers), which is acceptable if this overhead is compensated by fast graphics hardware. There are some adaptations of such drivers for generic framebuffer devices, but because of the display hardware oriented design, they do not make use of platform specific optimization mechanisms.

In general, applications use toolkit library functions, which in turn map to driver functions, either by means of direct calls or some inter-process communication mechanism. The driver then branches according to the display HW type (display processor), the user configured screen resolution (width, height) and color depth, invoking the functions which actually do the work (mostly by delegating it to the display processor).

Embedded computing devices mostly don't have accelerated display HW, and provide just a framebuffer memory area. They usually have a fixed resolution and color depth, i.e. don't have a high degree of runtime configurability. They mostly have RISC like processors which provide efficient mechanisms for memory block transfers (number of registers). It is desired to have a graphics rendering mechanism for use with an embedded device which is designed to compensate for a lack of expensive display hardware.

To be suitable for global deployment, it is desired to be able to use local font sets. To overcome the problem of various different, and partially conflicting character encoding schemes, the Unicode initiative has become a de-facto standard. It is based on multi-byte character encoding and as of today contains about 50,000 character symbols.

This constitutes a considerable problem for displaying unicode text with conventional font rendering systems. In general, a font object includes of a collection of per-font and per-character attribute values, the character attributes being index-accessed (with the character code) for efficiency reasons.

The per-character attribute (width, bearing, glyph etc.) implementations usually use arrays of the size of the required character set. While this involves just about 10 kB for a bitmapped 256-character font instance (e.g. ASCII), a full unicode font (50,000 characters) would use up to 2 MB for a single instance (face/weight/slant/size). Typical applications (e.g. web-browsers) utilize about 4 different instances, adding up to 8–10 MB of required font space. This amount of memory is not generally available for embedded devices (16 MB RAM/ROM). It is therefore desired to have a font extension mechanism which permits the implementation of a reasonable number of font instances in less than ,e.g., 2 MB of memory.

In order to provide a suitable basis for a broad range of applications for use with embedded devices, it is recognized herein that it would be advantageous to implement a full windowing system with z-order capabilities (i.e. windows can overlap, with foreground windows partially or fully obscuring background windows). In addition, the rendering mechanism should support explicitly set, non-z-order implied clipping rectangles. Devices having special display processors may implement this by means of HW-augmented region clipping. As mentioned above, embedded devices usually do not have special display processors. It is desired to provide an embedded device with a rendering mechanism that supports explicitly set, non-z-order implied clipping rectangles.

Handwriting recognition systems known in the art include the GRAFFITI system, developed by Xerox, which is used in the PalmPilot, and the JOT system, which is used in WinCE (and others). It is desired to have an improved handwriting recognition system, particularly for use with an embedded computing device.

SUMMARY OF THE INVENTION

A graphics rendering software program for use on an embedded computing device includes an application layer, a graphics toolkit, and a graphics driver for rendering multiple drawing surfaces, including a first drawing surface and a second drawing surface, on a display of the embedded computing device. The graphics driver is configured to render the first drawing surface at least partially overlapping the second drawing surface on the display. When the first drawing surface is rendered as partially overlapping the second drawing surface, a visible portion of the second drawing surface is computed as a set of rectangular clip segments.

A graphics rendering software program for use on an embedded computing device is further provided including an application layer, a graphics toolkit, and a graphics driver for rendering multiple drawing surfaces, including a first drawing surface and a second drawing surface, on a display of the embedded computing device. The graphics driver is configured to render the first drawing surface at least partially overlapping the second drawing surface on the display. When the first drawing surface is rendered as partially overlapping the second drawing surface, a visible portion of the second drawing surface is computed as a set of rectangular clip segments. The set of rectangular clip segments is stored as a graphics context object corresponding to unobscured segments of the second drawing surface.

A graphics rendering software program is also provided for use on an embedded device including an application layer, a graphics toolkit, and a graphics driver for rendering multiple drawing surfaces, including a first drawing surface and a second drawing surface, on a display of the embedded computing device. The graphics driver is configured to render the first drawing surface at least partially overlapping the second drawing surface on the display. When the first drawing surface is rendered as partially overlapping the second drawing surface, a visible portion of the second drawing surface is computed as a set of rectangular clip segments. The set of rectangular clip segments is stored as a graphics context object corresponding to unobscured segments of the second drawing surface. Each rectangular clip segment of the set of rectangular clip segments is iteratively output to the display for displaying the visible portion of the second drawing surface.

A graphics rendering software program is also provided for use on an embedded computing device including an application layer, a graphics toolkit, and a graphics driver for rendering multiple drawing surfaces, including a first drawing surface and a second drawing surface, on a display of the embedded computing device. The graphics driver is configured to render the first drawing surface at least partially overlapping the second drawing surface on the display. When the first drawing surface is rendered as partially overlapping the second drawing surface, a visible portion of the second drawing surface is computed as a set of clip segments.

A graphics rendering software program is also provided for use on an embedded computing device including an application layer, a graphics toolkit, and a graphics driver for rendering multiple drawing surfaces, including a first drawing surface and a second drawing surface, on a display of the embedded computing device. The graphics driver is configured to render the first drawing surface at least partially overlapping the second drawing surface on the display. When the first drawing surface is rendered as partially overlapping the second drawing surface, a visible portion of the second drawing surface is computed as a set of clip segments. The set of clip segments is stored as a graphics context object corresponding to unobscured segments of the second drawing surface.

A graphics rendering software program is also provided for use on an embedded computing device including an application layer, a graphics toolkit, and a graphics driver for rendering multiple drawing surfaces, including a first drawing surface and a second drawing surface, on a display of the embedded computing device. The graphics driver is configured to render the first drawing surface at least partially overlapping the second drawing surface on the display. When the first drawing surface is rendered as partially overlapping the second drawing surface, a visible portion of the second drawing surface is computed as a set of clip segments. The set of clip segments is stored as a graphics context object corresponding to unobscured segments of the second drawing surface. Each clip segment of the set of clip segments is iteratively output to the display for displaying the visible portion of the second drawing surface.

A method of rendering graphics including overlapping drawing surfaces on a display of an embedded computing device is also provided including computing a set of clip segments corresponding to a visible portion of a partially obscured drawing surface, and rendering the partially obscured drawing surface along with an overlapping drawing surface on the display.

DETAILED DESCRIPTION OF THE PREFERRED EMBODIMENTS

Figure 1:
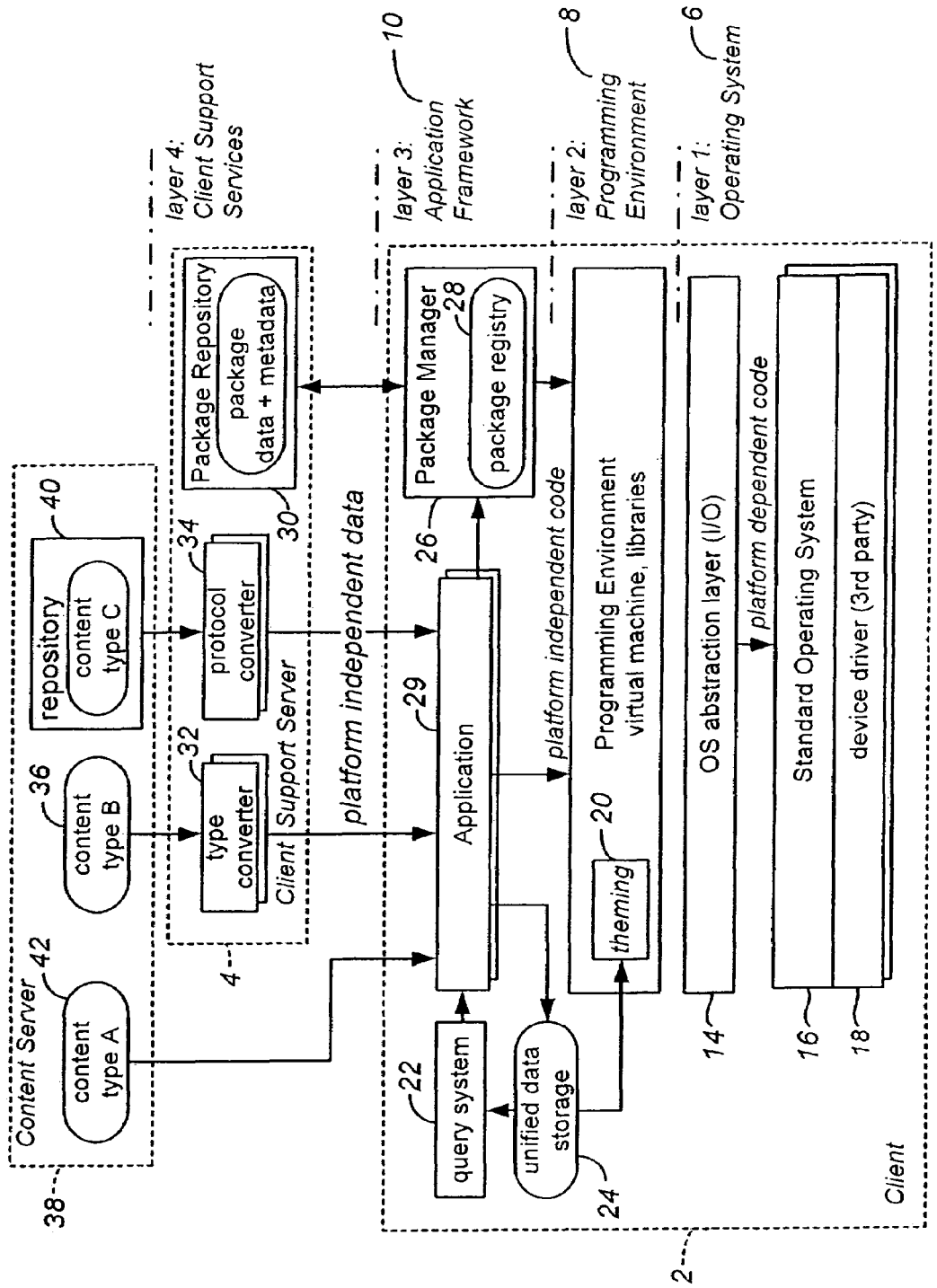
FIG. 1 schematically illustrates a software architecture according to a preferred embodiment.

A preferred overall software architecture for use with an embedded device includes client software 2 and server software 4, and is schematically illustrated at FIG. 1. It may be subdivided into four different layers, including three layers (1–3 below) and a server layer (4 below):

1. Operating System (6)
2. Programming Environment (8)
3. Application Framework (10)
4. Client Support Services (4)

The preferred architecture is based on a distributed computing model and uses a dedicated server component, or client support server 4 to offload computing tasks from the client 2, and to provide on-demand installable SW components. Each of the mentioned layers provides certain advantageous features, as described herein, in accordance with what is desired in the field of embedded device computing, e.g., as set forth above.

The operating system (OS) layer 6 includes an abstraction layer 14 which enables the use of a standard operating system 16 and usage of third party components like device drivers 18, and also provides the flexibility to exchange these operating systems 18 without affecting the rest of the system. This features relates particularly to features described below with respect to graphics rendering mechanisms on small embedded devices.

The programming environment layer 8 is preferably implemented as a Java virtual machine and corresponding libraries. This facilitates several features which permit enhanced performance (locking mechanism, see below), provides advantageous input methods (handwriting recognition, see below), and enables configurable user interfaces (theming 20, see below). The application layer has a query system module 22 which communicates with a unified data storage module 24. The unified data storage module 24, in turn, communicates with the programming environment 8 and participates in the theming 20.

The application framework 10 includes an advantageous application model, which provides an automated, on-demand triggered package management system via a package manager module which includes a package registry 28. This mechanism is preferred for enabling on-demand updates/installation of new software components via the network, and is described in more detail below. An application 29 is also shown running within the application framework 10 of the client 2.

The client support server 4 provides the backend for this package management and in this sense includes a package repository module 30, as shown. In addition, the client support server 4 has functions to transform complex content and/or protocols into simpler ones, having a type converter module 32 for translating content 36 received from a content server 38 and a protocol converter module 34 for mapping protocols from a repository 40 on a content server 38, thus offloading expensive functions from the client 2. The client 2 may have capability to directly receive some content 42 from a content server 38 or otherwise such as in a peer-to-peer networking environment, wherein it is understood that when "content server" is used herein, it is meant to include any device from which content may be obtained.

Client Support Services

As mentioned above, embedded devices are typically memory constraint (i.e., have a limited amount of RAM/ROM), and typically do not have secondary storage (disks). Embedded devices also differ significantly from desktop computers in terms of processing power, screen resolution, and visuals (color-model). As a consequence, it is more difficult to install all potentially interesting software components before shipment of the device and/or to run all applications on all embedded device types, e.g., PDAs, cell phones, etc. A preferred embedded device does, however, include some network connection capability. Therefore, it is a feature of the preferred software architecture to provide reliable and efficient access to software and applications by the embedded device through network connection to the client support server 4 introduced above with reference to FIG. 1.

The application model 10 of the client software 2 makes it possible to offload certain tasks to, and to automatically install software components from, a dedicated server 12, providing so-called "client support services" to the client 2. While the content server 38 would typically not be "client-aware" (i.e., with respect to architecture, capabilities, installed software, etc.), the client support server 38 would preferably be client-aware. The client application model/framework 10 is preferably designed in a way that it automatically reaches out to a well known (configured) client support server 4 in case it encounters some content from the content server 38 that the client 2 does not know about, or that the client 2 cannot handle locally.

Figure 2:
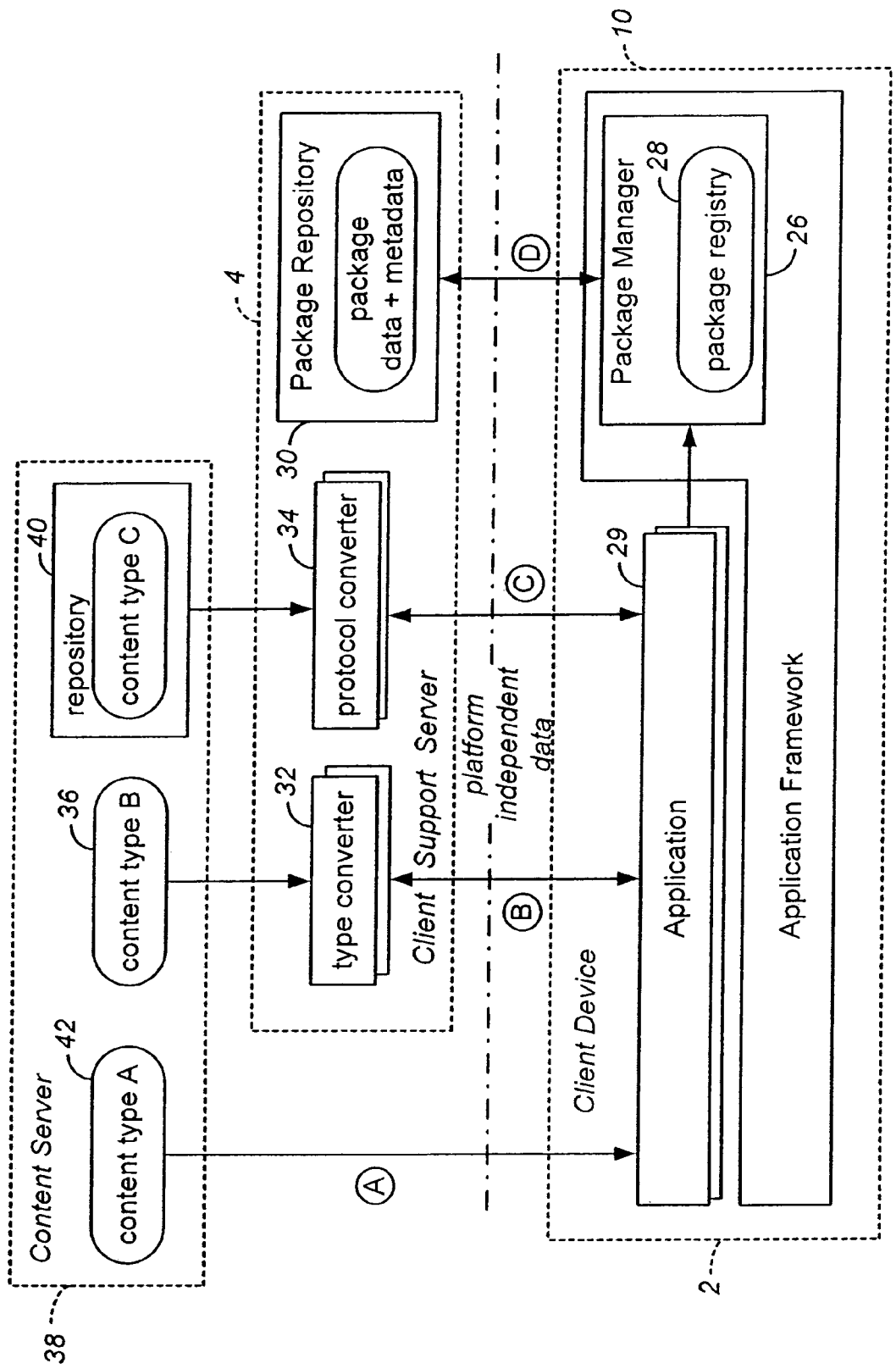
FIG. 2 schematically illustrates processes for retrieving content using a client support server according to a preferred embodiment.

Referring now to FIG. 2, the client 2 may retrieve certain types of content, e.g., content type A, directly from the content server 38 (or a generic proxy of it), using data path (A). In case this is not possible because of client constraints, either path (B) via the content type converter 32 or path (C) via protocol converter 34 are available through the client support services server 4. Path (D) is described in more detail below.

Figure 3:
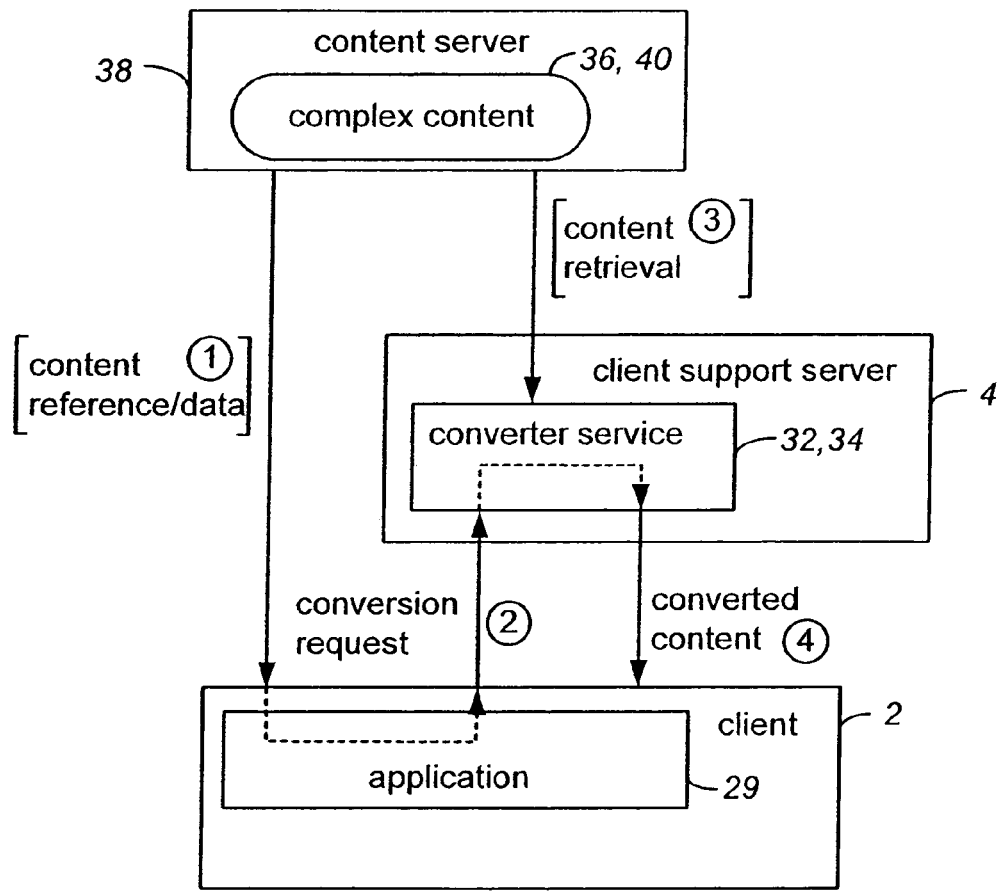
FIG. 3 schematically illustrates a process for retrieving simplified content converted from complex content by a converter service on a client support server according to a preferred embodiment.

Referring now to FIG. 3, a communication may be, although not necessarily, initiated by encountering a URI or content data (36 or 40, e.g.) which the client 2 is not configured to process, as illustrated by step (1). The client 2 then communicates a conversion request to the client support server 4 as illustrated by step (2). If the complex content data was supplied with the request, then the process would proceed to step (4). However, in case the complex content data was not supplied with the request, then the client support server 4 retrieves it from the content server as illustrated at step (3). In either case, the client support server converts the data, e.g., by translating complex content 36 to simplified content using the type converter module 32 or by mapping a complex protocol 40 to a simplified protocol using the protocol converter 34, each as illustrated at FIGS. 1 and 2. Finally, the client support server 4 sends the converted content back to the client 2 in a format/protocol that the client 2 can process as illustrated at step (4).

A typical format conversion example could be a complex word-processor document, wherein the embedded device, such as a handheld device, is configured such that it is only capable of displaying HTML or other markup language type content. In this example, the type converter 32 would convert the word processor document to markup language type. A protocol conversion example could be accessing a mail server via a simple message protocol, leaving the complexities to handle IMAP, POP3, etc., to the protocol converter service 34 running on the client support server 4.

Figure 4:
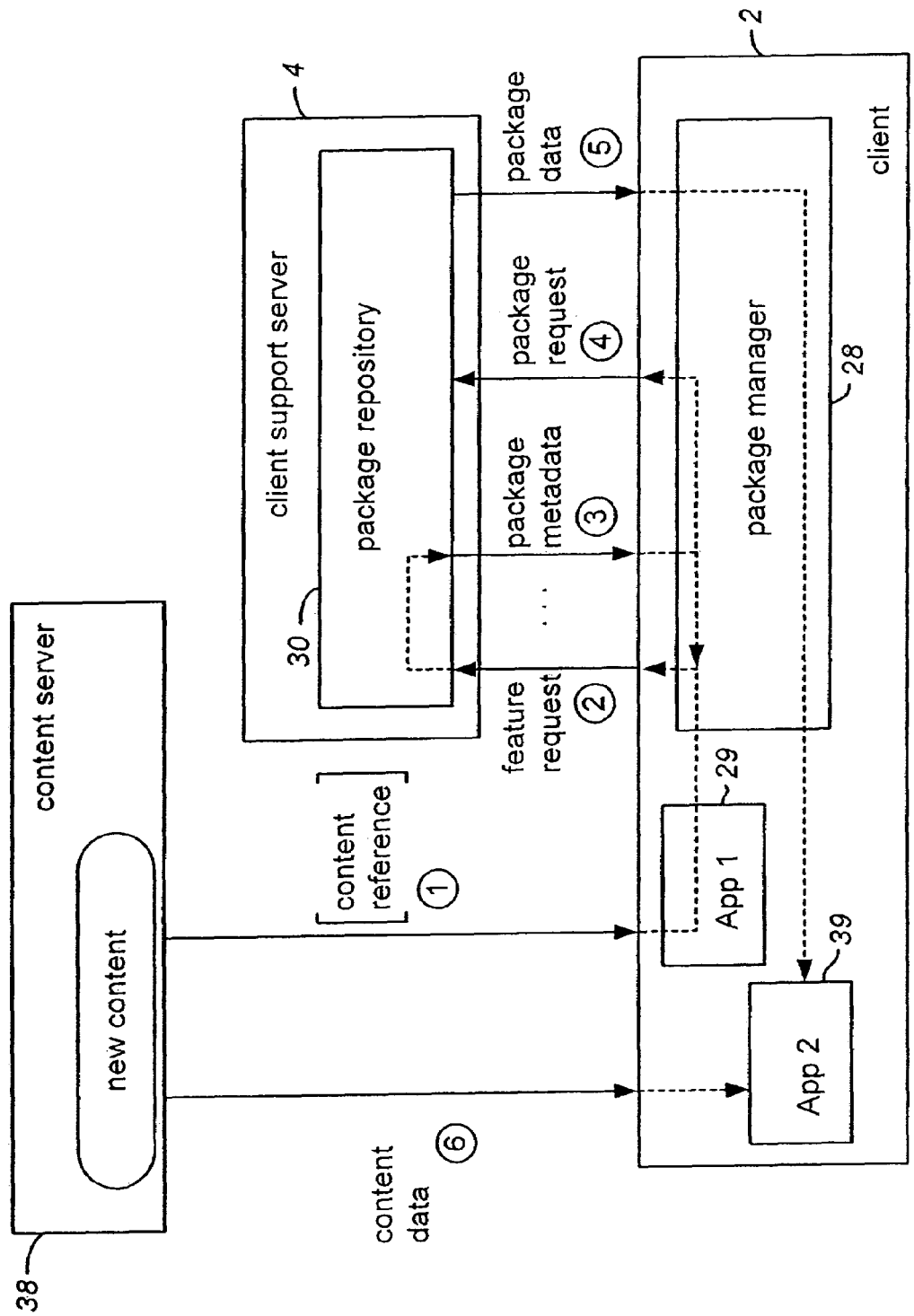
FIG. 4 schematically illustrates a process for retrieving a software package or update using a package manager module on a client and a package repository on a client support server according to a preferred embodiment.

The client update/extension mechanism (D) (see FIG. 2) will now be described with reference to FIG. 4. The client update/extension mechanism (D) may typically start with a content reference (URI) from the content server 38 that the client 2 does not know about or is not configured with, as having only application 1 (29) installed, as illustrated by step (1) in FIG. 4. For example, the client 2 may have no registered protocol-handler to retrieve the content, or may have no registered viewer for its format. In this case, a feature request is sent to the package repository service 30 on the client support server 4 as illustrated by step (2). The feature is looked up in the repository 30 (containing client software packages), and sent back as a package description (metadata) as illustrated by step (3), containing dependencies and conflicts to/with other packages. This is checked on the client against installed packages, potentially resulting in additional requests for missing dependency packages, i.e., repeating step (2).

Once all dependencies have been resolved, the required package data is retrieved from the client support server 4 as step (5) and finally processed as an install transaction (i.e., fully processed or reverted) of application 1 (39) at step (6). The user of the embedded device may be involved in the process by initiating a confirming request at step (4), although the system may be configured to automatically perform the process. In either case, the user doesn't not have to know about the feature with respect to package mapping, dependencies or constraints. Alternatively, step (3) may involve a user selection from a list of alternative packages.

Preferably, all client support services are utilized via an application model which is driven by portable documents written in a markup language (e.g., HTML or XML). Documents can be nested, which enables a local service to embed a new child document into its requester. New local services may be installed via the package manager 28, and may in turn use a remote converter service, as described below with reference to FIG. 5.

Figure 5:
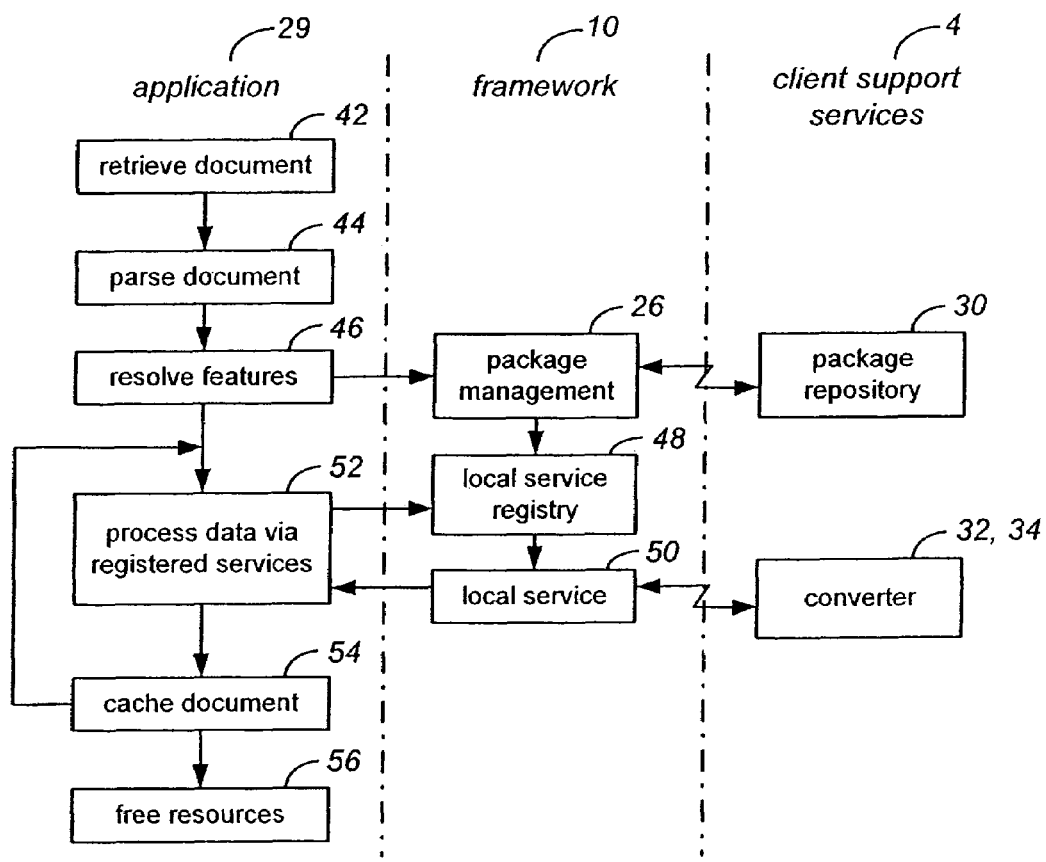
FIG. 5 schematically illustrates a process for retrieving a software package or update using a package manager module, local service registry and local service on a client and a package repository on a client support server according to a preferred embodiment.
Figure 6:
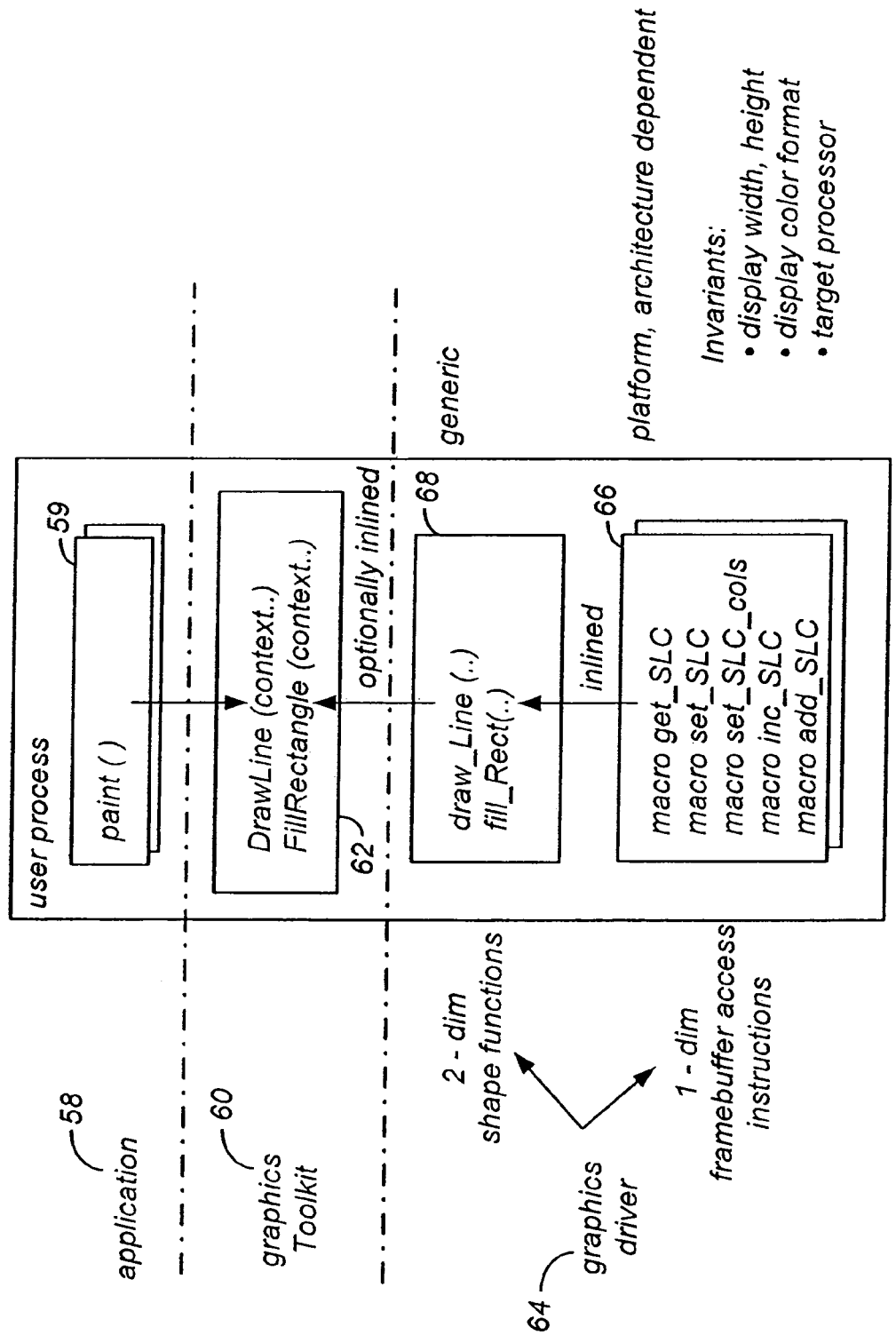
FIG. 6 schematically illustrates a graphics rendering mechanism according to a preferred embodiment.

Referring to FIG. 5, an illustration of how the process is performed by the application 29, the application framework 10 and the client support services server 4 is described below. The application 29 performs the steps of retrieving the document 42, parsing the document 44 and resolving features 46. The application framework 10 then becomes involved for package management 26, and communicates with the package repository 30 of the client support server 4. The package manager 26 communicates with a local service registry 48 which utilizes a local service 50. The local service communicates with the converter service 32, 34 of the client support server 4. The application 29 processes data via registered services 48 by communicating with the local service registry 48 and the local service 50. The document is cached 54, wherein the process may return to step 52. Resources are freed by the application at step 56.

Graphics Rendering Mechanism

A graphics rendering mechanism for use with an embedded device which is designed to compensate for a lack of expensive display hardware is described below. The preferred graphics rendering mechanism for use with an embedded computing device includes an application 58, e.g, paint 59, a graphics toolkit 60, e.g, including drawling and fill rectangle tools 62, and a graphics driver 64. The graphics driver 64 is divided into two parts: a framebuffer access macro layer 66 and a shape function layer 68. The framebuffer access macro layer 66 includes a target architecture (CPU) specific instruction set to set/retrieve pixel values into/from the framebuffer memory. The framebuffer access instructions are expanded or inlined into the shape function layer 68, to avoid or reduce call overhead. The shape function layer 68 itself can be inlined into the application, thus providing enhanced efficiency (at the cost of runtime configurability, which is less relevant for embedded systems as compared with, e.g., desktop systems).

One of the most performance critical tasks for a graphics driver is to map certain mathematically described shapes (lines, circles etc) to the display pixel raster, which involves finding the closest raster pixel for a given mathematical point. This is called rasterization.

The preferred rasterizer utilizes the mentioned characteristics of embedded devices, to compensate lack of expensive display hardware by means of
- aggressive inlining
- processor specific acceleration of scanline access functions Display adapter acceleration can still be done at the shape function level 68 (e.g. drawLine), but the preferred mechanism introduces a whole new layer of processor specific acceleration, which is implemented as a set of macros, i.e., enables inlining up to a point where there is little or no indirect invocation of rendering functions.

Figure 7:
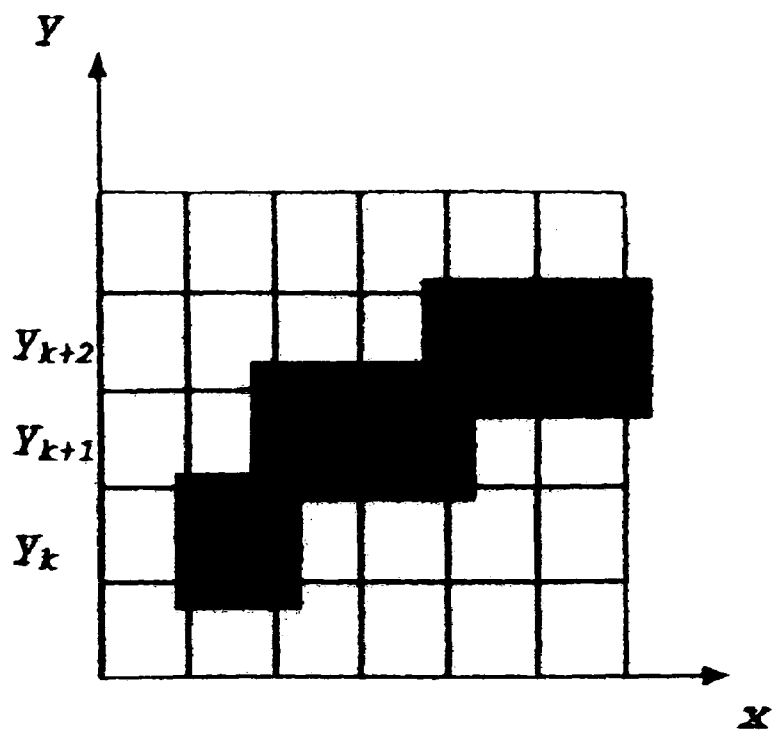
FIG. 7 schematically illustrates scene cohesion of a graphics rendering mechanism according to a preferred embodiment.

Most shape algorithms are conceptually 2-dimensional, i.e., assume a logical framebuffer model which can be thought of as a matrix of pixels, each addressed by a x,y coordinate pair. However, the physical framebuffer is just a simple memory range, i.e., 1-dimensional, organized into so called scanlines (the matrix rows). The preferred rasterizer bridges this gap by means of the fact that most shape function algorithms make use of shape-specific scene cohesion properties, where new pixel positions are derived from previous pixel positions. The Bresenham line drawing algorithm can be considered as a typical example: depending on the slope of the line, the algorithm iterates in 1-increments through the major delta coordinate (e.g., x), and accumulates error terms for the dependent pixel coordinate (e.g., y). If the error term (which is usually inexpensive to evaluate) exceeds a certain threshold, the dependent pixel coordinate is incremented ( see FIG. 7).

Such an algorithm can be re-formulated so that it uses an abstract set of scanline access instructions:
  get_SLC(x,y) ->s compute linear pixel address for a given x,y point
  set_SLC(s,color)

set the color value of a given pixel address
  set_SLC_rows(s,len,color)

set color values for a consecutive range of pixels
  copy_SLC_rows(s,len,d)

copy color values for consecutive range of pixels from other location
  inc_SLC(s) ->s increment the pixel address by 1
  add_SLC(s,n) ->s increment the pixel address by a given number These instructions can be implemented as processor specific macros, which advantageously can have a significant performance gain for setting/copying pixel ranges (i.e., block transfer operations used in filling rectangles, drawing horizontal/vertical lines, copying bitmaps, etc.). Compared to a generic setPixel(x,y,color) function, this also eliminates a significant number of expensive multiplication instructions, replacing them by simple additions, or even increments. By means of these pseudo instructions, the 2-dimensional shape construction is separated from configurable 1-dimensional, processor specific scanline functions.

Figure 8:
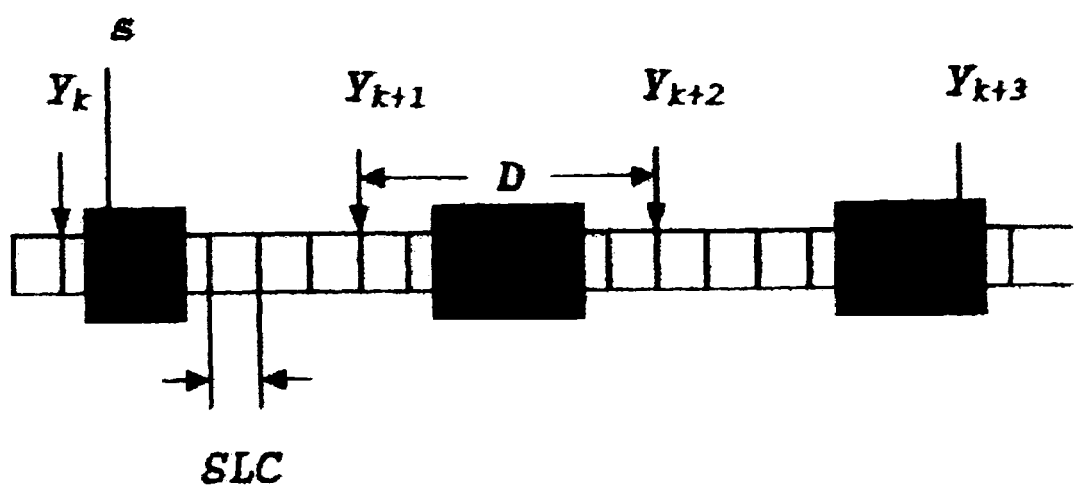
FIG. 8 schematically illustrates a scanline cell according to a preferred embodiment.
Figure 9:
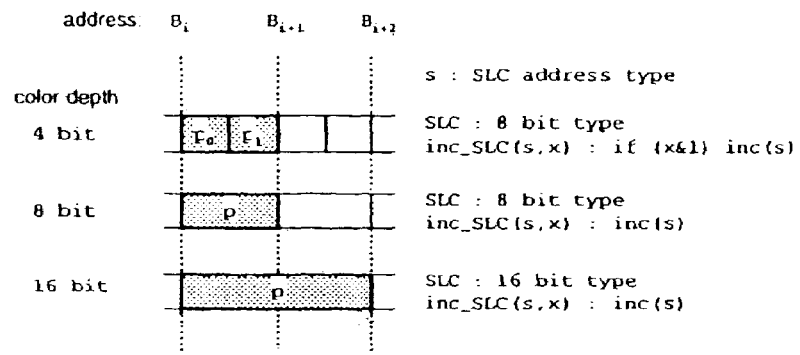
FIG. 9 schematically illustrates different color depths.

This separation is based on the concept of the SLC, the build-time configured scanline cell type, which is the smallest addressable scanline unit holding the color information, e.g., for at least one pixel (see FIGS. 8 and 9). This abstraction is used in order to deal with visuals which pack several pixels into one byte (e.g. black/white, or VGA). These visuals can be dealt with by means of adding a column parameter (x) to the mentioned scanline access instruction set.

Font Extensions

Figure 10:
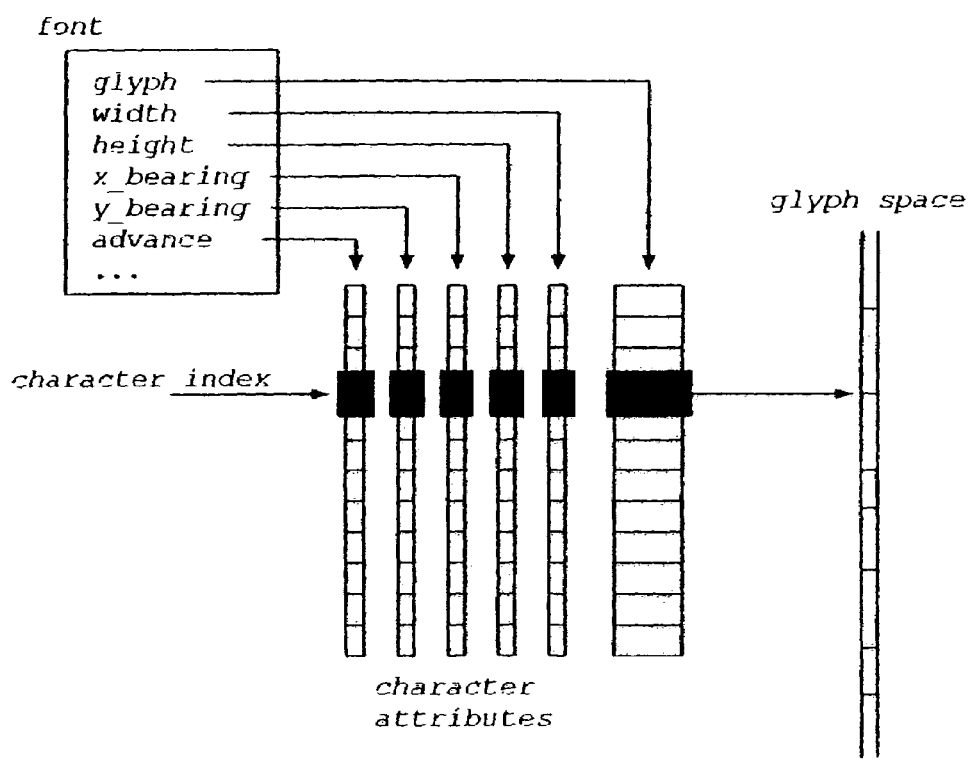
FIG. 10 schematically illustrates the unicode font character set.
Figure 11:
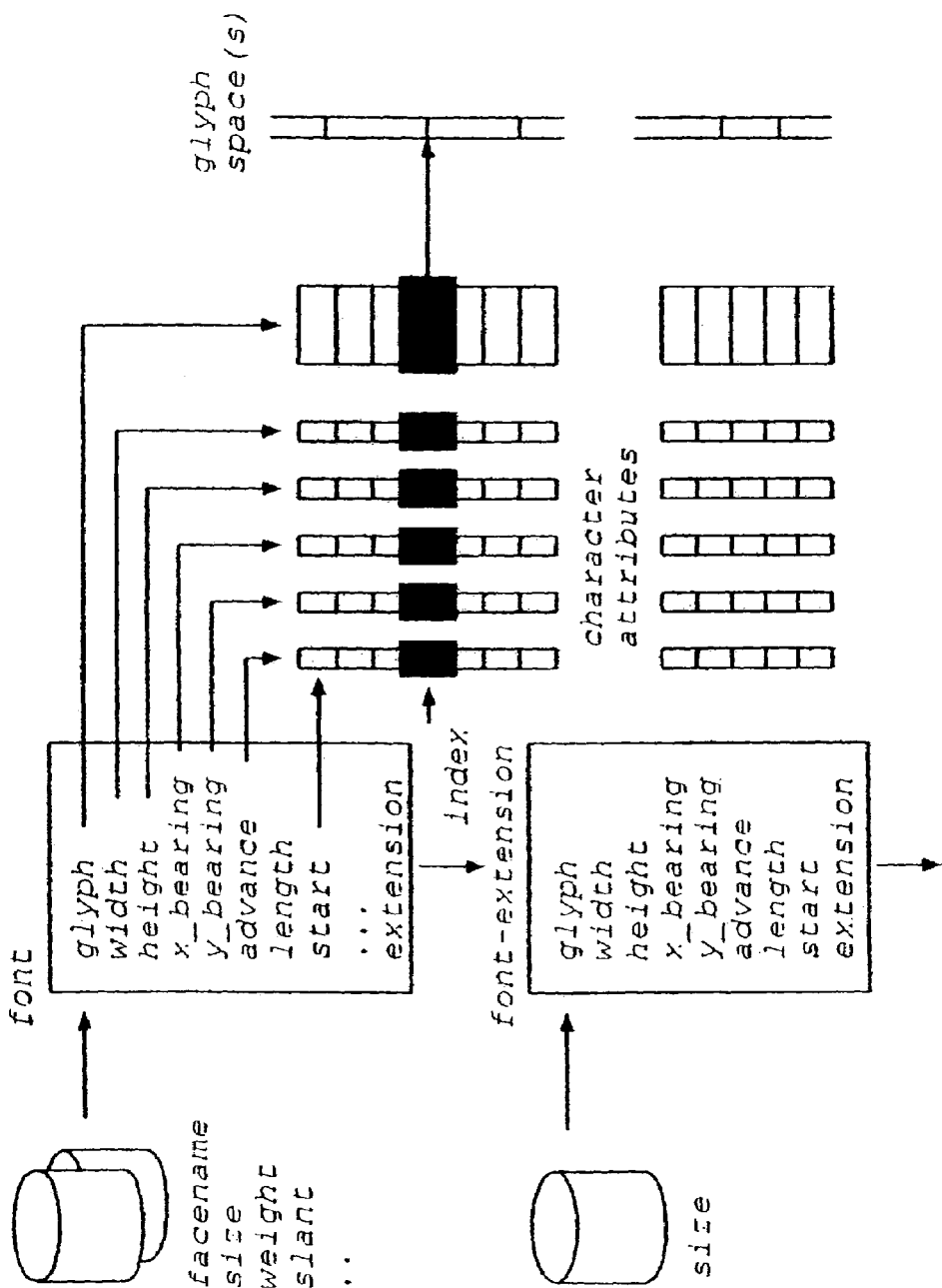
FIG. 11 schematically illustrates a font extension mechanism according to a preferred embodiment.

To overcome the problem set forth above with respect to the unicode set and the limited memory capacity available on embedded devices, as illustrated at FIG. 10, a preferred font handling mechanism is now described with reference to FIG. 11. The preferred font-handling mechanism is based on the assumption that for most localizations, only a single primary character subset is used from the whole unicode set. There might be characters from additional, secondary subsets interspersed, but these sets are usually smaller, and are just used for mixed in words/names. As a example, a typical Japanese localization uses about 8000 characters from the Kanji/Katakana/Hiragana unicode subsets, with occasional western names rendered in latin characters. Such a font instance would typically add up to about 500 kB.

The preferred font handling mechanism therefore assumes that (especially per-character) font attributes are kept in disjunct, but linked memory objects, so called font-extensions. In case of a very expensive extension (e.g., Kanji), this extension could be shared between several font instances, especially for different per-font rendering attributes like italic, which mostly make sense for latin font sets anyway. In addition, font-extensions can be loaded on demand, which is particularly advantageous on systems not providing memory mapped font instances (i.e., filesystem data is duplicated into the process address space).

By splitting up the whole unicode font range into configured primary/secondary font extensions (with possibly shared secondary extension data), it becomes feasible to implement a reasonable number of font instances in less than 2 MB of memory. The fact that most of the text is rendered in the primary character subset, and secondary subsets are used on a per-word basis (i.e. the number of extension switches is relatively low), can be used to compensate the efficiency penalties (caused by per-character font-extension checking) by means of keeping a reference to the most-recently-used extension.

Clipping

A structure and algorithm is now described which compensates for the lack of embedded devices having a sophisticated display processor, and enables a straight-forward, inexpensive implementation of the rasterizer, which is preferably based on rectangular clipping at the driver level. As mentioned above, the preferred embedded device is configured to display drawings surfaces or windows overlapping one another on the display.

Figure 12:
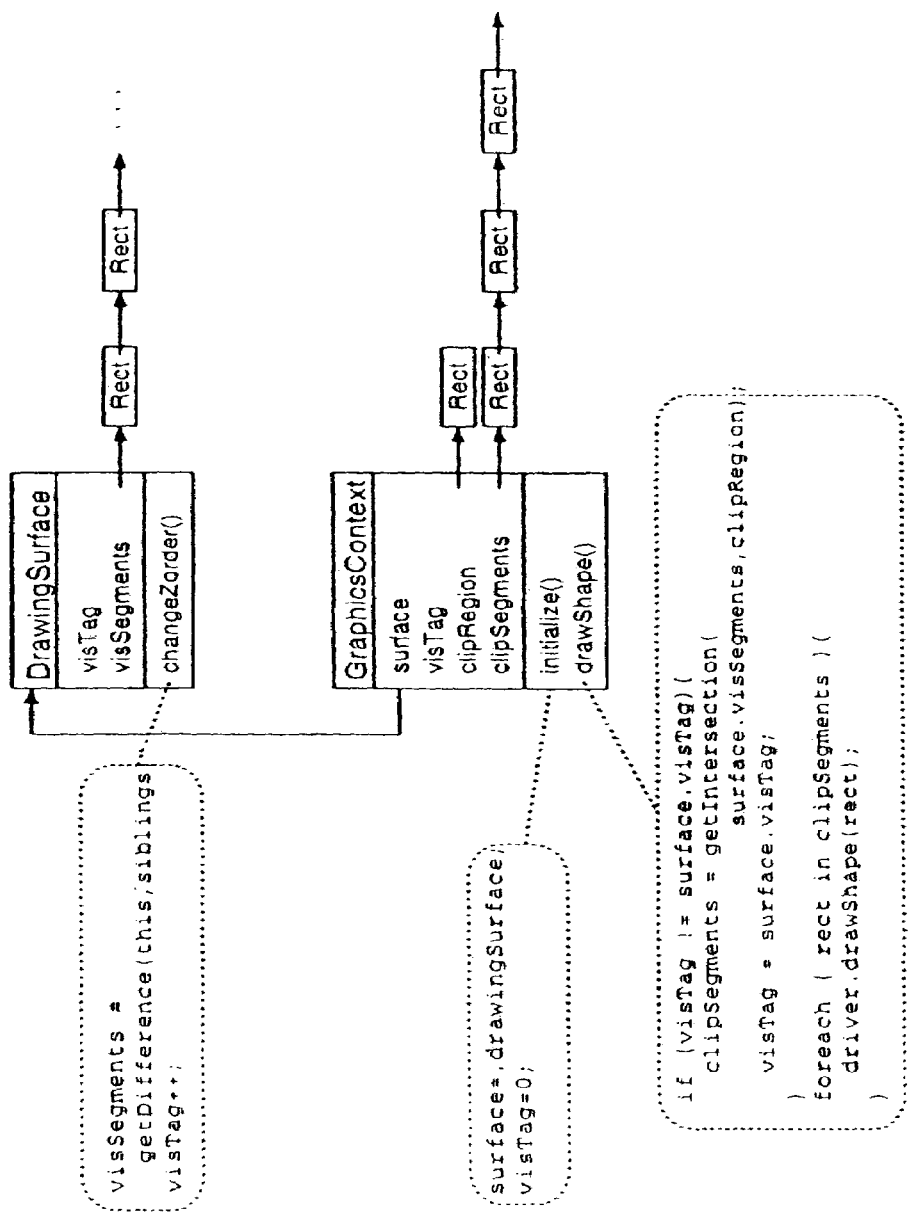
FIG. 12 schematically illustrates a graphics rendering mechanism for providing overlapping drawings surfaces on an embedded device display according to a preferred embodiment.

FIG. 12 describes a preferred algorithm by means of a UML-like diagram, with boxes representing types/classes (including name, data members and functions), round boxes representing snippets of the key functions, thin arrow lines representing references, thick arrow lines representing inheritance. A first feature of the preferred algorithm involves an object which is of type 'DrawingSurface', and it denotes a UI component (i.e. Window) that has a z-order attribute (stacking order), i.e., can be obscured by siblings. Another feature involves a second object which is of type 'GraphicsContext', which bundles rendering attributes like font and colors. A 'GraphicsContext' instance is preferably attached to a single 'DrawingSurface' object, i.e., includes a reference to it which is set during the 'GraphicsContext' initialization.

One of the rendering attributes of a 'GraphicsContext' object can be an explicitly set clipping region ('clipRegion'), i.e., the area to which graphics output is confined to (which is application specific). Graphics context objects can have explicitly set attributes like color, font, and clipping regions. When an output operation is performed, a visibility tag (see below) of the attached surface object is checked for changes. If the tag value has been modified, a set of rectangular clip segments are computed and stored in the graphics context object, by means of calculating the intersection of the drawing surface's visible segments with the graphics context's clipping region:

$$\{R_{clipSeg}\}_{context} = \{R_{visSeg}\}_{surface} \text{ intersected with } \{R_{clip}\}_{context}$$

Additional advantageous features of the preferred algorithm include "visible segments", "clip segments", and "visibility tags". Visible segments ('visSegments'), are sets of rectangles describing the visible, not obscured region of a 'DrawingSurface'. These visible segments are preferably changeable by modifying the z-order of the 'DrawingSurface' object (e.g., by calling a function 'changeZorder( )'), which is assumed to happen orders of magnitudes less frequent than executing the drawing operations using these segments (e.g. 'drawShape( )'), and are kept as attributes of the 'DrawingSurface'. Every change of the visible segment set increments a visibility tag ('visTag'), which is also stored as a 'DrawingSurface' attribute.

Clip segments ('clipSegments'), describe the exposed region of a 'DrawingSurface' instance which falls within the clipping region of a 'GraphicsContext' instance. When an output operation (e.g. 'drawShape( )') is executed via a 'GraphicsContext' object, the visibility tag stored in the 'GraphicsContext' object is compared to the one stored in the corresponding 'DrawingSurface'. If the tag value has been modified, a new set of rectangular clip segments is computed and stored in the 'GraphicsContext' object, by means of calculating the intersection of the visible segments of the 'DrawingSurface' with the clipping region of the 'GraphicsContext'.

The output operation is then performed iterative for each clip segment rectangle, i.e., preferably does not use more than simple rectangular clipping from the underlying graphics driver/rasterizer.

.
:

GraphicsContext::drawShape (..)::=

. .

foreach (rect in clipSegments)

displayDriver.drawShape(rect)

. .

Figure 13:
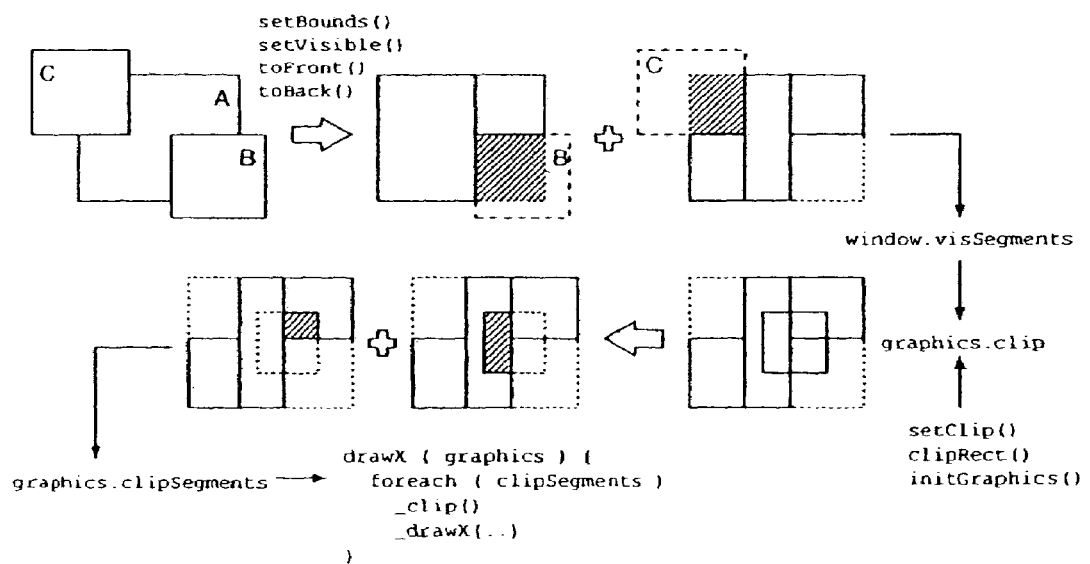
FIG. 13 schematically illustrates schematically illustrates a graphics rendering mechanism for providing overlapping drawings surfaces on an embedded device display using rectangular clip segments according to a preferred embodiment.
Figure 14:
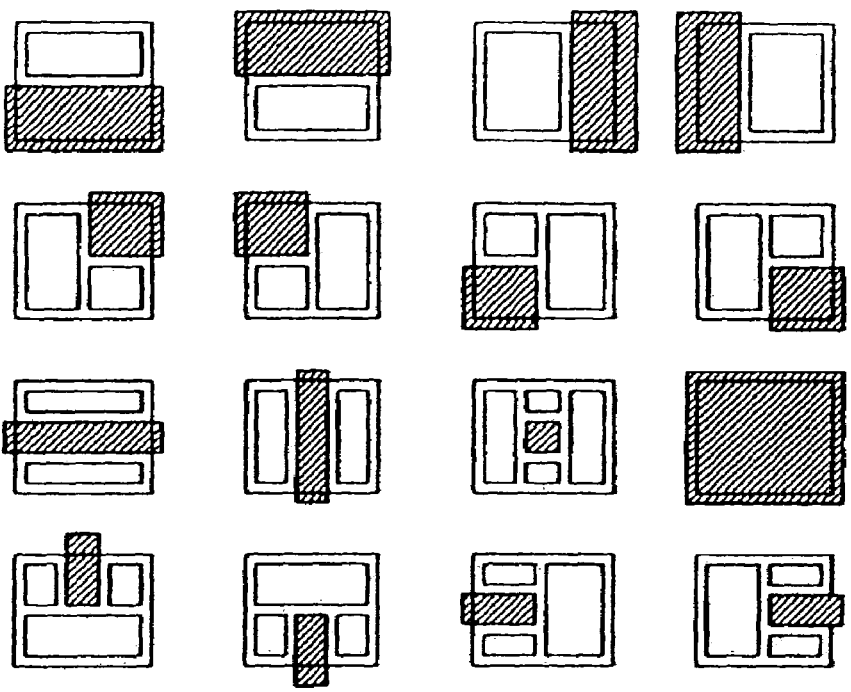
FIG. 14 schematically illustrates different visible portions of an obscured drawing surface as sets of rectangular clipping segments.

Referring to FIG. 13, the computation of visible segments and clip segments is done by means of an intersection algorithm which treats rectangles and sets of non-overlapping rectangles (aka regions) uniformly, the underlying data model being a linkable rectangle (i.e., sets represented as a linked list of rectangles). For each combination of two overlapping rectangles $R_1$ and $R_2$, the inverse logical product is either nil ($R_1$ fully obscured by $R_2$), a single rectangle ($R_1$ left/upper/right/lower half obscured by $R_2$), or a set of 2 to 4 rectangles, as illustrated at FIG. 14.

Calculating intersections of sets of rectangles $\{R_1\}$ and $\{R_2\}$ is performed by building the union of result sets obtained by computing the inverse logical product for each combination of elements of $\{R_1\}$ and $\{R_2\}$. The preferred clipping mechanism is especially useful in the context of non-overlapping drawing surfaces (i.e., a small number of resulting clip segments, which are infrequently modified), since it includes only minimal overhead to handle set operations, and avoids expensive clip region re-calculations.

Theming

The following embodiment is particularly contemplated for use with embedded devices wherein a vendor and/or user configured look and feel is desired (e.g., colors, fonts, decorations), which is referred to herein as theming. To achieve this goal, a preferred software scheme includes a design which makes it possible to generically separate the logic of a user interface component from data which can be used to factorize the way it is rendered.

Figure 15:
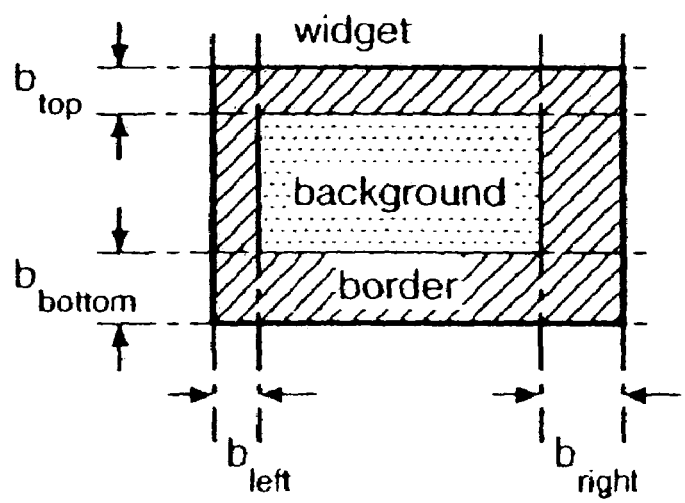
FIG. 15 schematically illustrates theming according to a preferred embodiment.

Referring to FIG. 15, the design is based on an abstraction that each UI component can be divided into a border and a background area, the border having invariant extensions for a specific component class (e.g. Button) and theme. Information which is displayed in the UI component (e.g., a Button label text) is drawn on top of the background, is clipped against the border, and is rendered in a separate step.

Rendering of the border and background may be performed automatically by the system (i.e., does not involve user code), and uses a per-UI component decoration object which may be theme-, UI class-, and style-specific. The decoration objet can be shared between instances of the same UI class, and gets set during the initialization of the UI via a configured theme object, which is a decoration factory.

Figure 16:
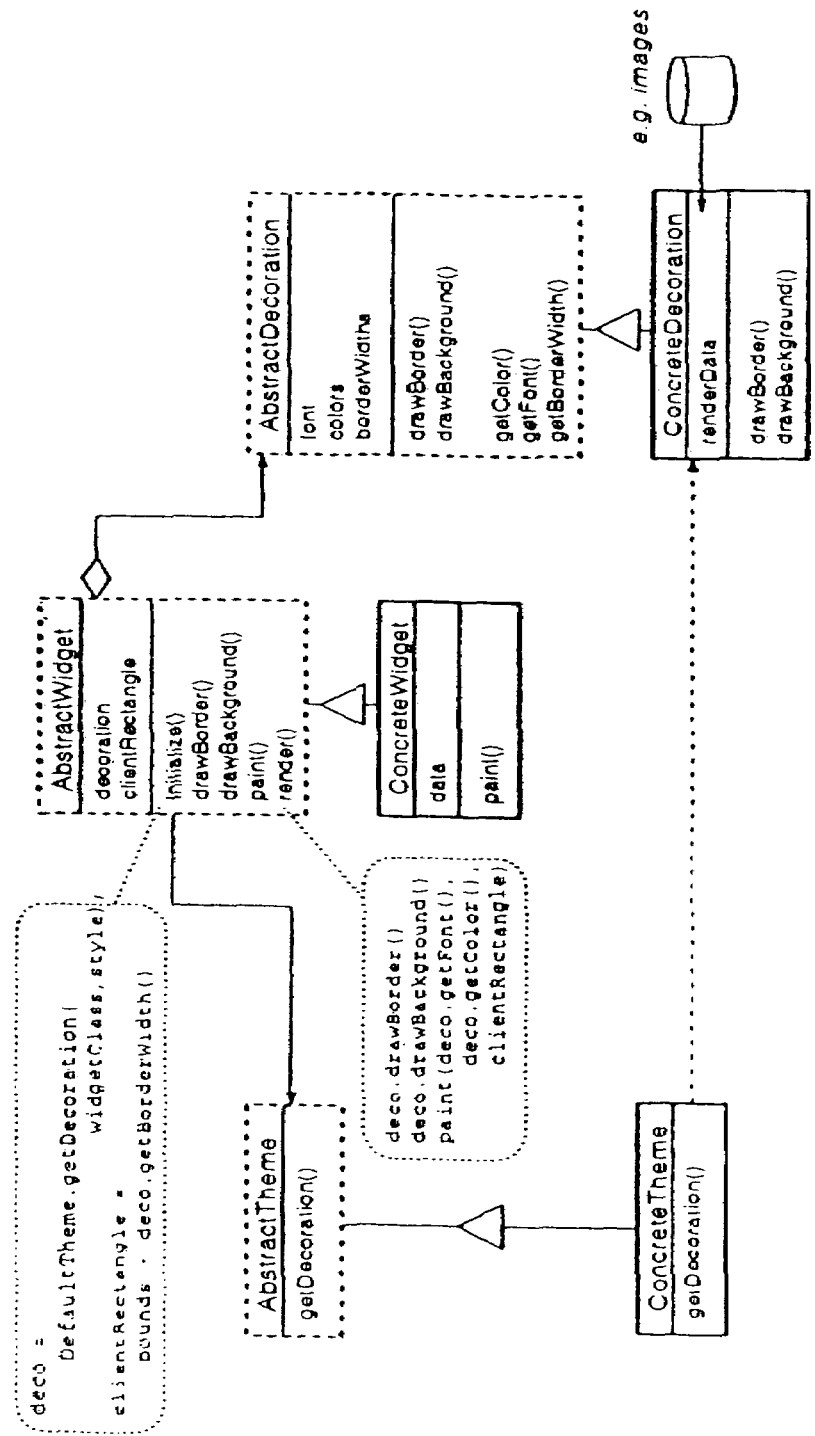
FIG. 16 schematically further illustrates theming according to a preferred embodiment.

This process is described in FIG. 16, by means of a UML-like diagram, with boxes representing types/classes (including name, data members and functions), round boxes representing snippets of the key functions, thin arrow lines representing references, thick arrow lines representing inheritance relationships (arrow pointing towards superclass), and dotted arrow lines representing object creation. Attributes which are used to render UI data (colors, font, clipping region), and to determine the UI component size (border widths), are queried from the decoration object. The preferred mechanism enables very flexible rendering schemes, e.g., partially transparent borders, backgrounds inherited by UI component-parents, and UI-state/style specific representation (e.g., 'focused' UI components). Theme and decoration classes can be completely hidden from user code, which makes the mechanism especially suitable for extending the functionality of existing application programming interfaces, i.e., to use theming in applications which are compatible to standard libraries (like Java). In addition to this generic design, the preferred confiugration also includes a specialized ConcreteDecoration class as illustrated in FIG. 16, which is based on a tiled image model.

There are three major types of objects involved in the preferred embodiment: "user interface components" (also called "widgets"), "decoration" objects, and "theme" objects, each of them derived from abstract base types, with at least one concrete derived type (e.g. 'AbstractWidget'/'ConcreteWidget'). UI component objects are the objects used in the application (e.g., a button), to display data (e.g. text), and to collect user input. Decoration objects are system constructs to separate the UI component logic from rendering border and background of a UI component. Theme objects are used to create specific decoration objects so that their types do not have to be hardcoded into the UI components.

The common UI component type ('AbstractWidget') references a 'Abstract Decoration' object, which is obtained from a global theme object ('AbstractTheme') acting as a abstract factory pattern (creating specific 'ConcreteDecoration' instances and returning them as 'AbstractDecoration' references). Creating and storing decoration objects is usually done as part of the UI component initialization (e.g. in initialize()). Once the 'decoration' object is known to the UI component, it uses it to obtain its own dimensions (e.g. by calling 'getBorderWidth( )'), which is done by adding the decoration-specific border extensions to its data-dependent background extensions.

The rendering process itself is divided into two separate layers: (1) automatic decoration rendering and (2) component specific data rendering. It is wrapped into a function which is automatically called by the system (e.g. 'render( )'), implemented in the common UI component type (e.g., 'AbstractWidget'), which first uses the decoration object to render border and background areas (e.g. by calling 'drawBorder( )', 'drawBackground( )'), and then calls a overloaded rendering function (e.g. 'paint( )'), which is implemented in the concrete UI component class to render the component specific data on top of the background area.

Figure 17:
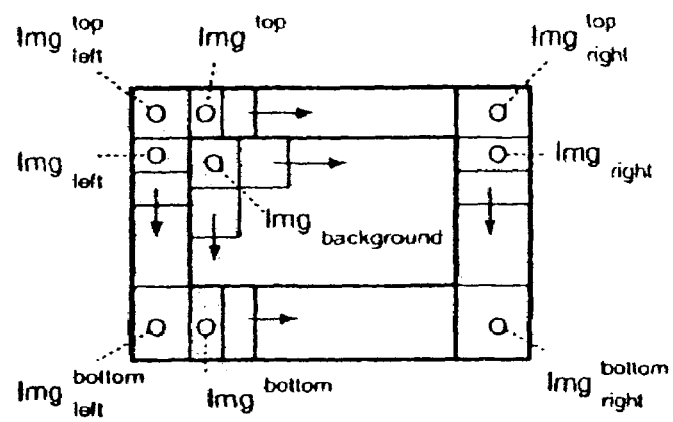
FIG. 17 schematically further illustrates theming according to a preferred embodiment.

Referring now to FIG. 17, there are preferably nine images (bitmaps) used per widget, one for each corner, one for each border, and one for the background. Border images are tiled left-to-right, top-to-bottom, and the background image is tiled across the whole interior of the widget.

This decoration scheme is especially advantageous for implementing artistic themes, i.e., providing customized look and feel without programming. The theme images can be kept in separate packages/archives which can be installed separately.

According to this preferred embodiment, a rendering policy is encapsulated into a shared delegation object (the 'decoration'), i.e., an API (not just data). A UI component area is logically split up into background and border. The border dimensions are queried and attributes rendered (e.g., font,color) from the decoration object, and the UI component size is calculated from it. The drawing is preferably split up into a non-overridable system part (e.g., "render( )" in the picture) and an overridable user part (e.g., "paint( )").

Handwriting Recognition

This following description relates to a preferred handwriting recognition system which is designed to provide the following advantages particularly for use with embedded devices:

fast and small so enabled for use on low performance processors and with low memory footprints Uses integer arithmetic since most embedded processors do not have floating point ability Recognizes uni-stroke characters such as may be used on Palm and WinCE devices, such that it can recognize both Grafitti (Palm) and JOT (WinCE+others)

extensible to support multi-stroke characters such as non-latin language support The preferred algorithm presented here preferably includes the following features:

1. Character strokes are encoded as an integer value
2. A small number multiple (as small as one) integer encoding represents each recognizable character
3. Strokes are encoded by observing the way characters are drawn rather than by what the character actually looks like
4. The character encoding includes a series of direction events denoting changes in movements north, east, south and west
5. The character encoding can be extended to improve recognition by adding special events to note specific actions. These actions include termination of a stroke near the beginning point (allowing better recognition of characters such as 'O', 'B', etc.), as well as pen up-down events to allow for encoding of multi-stroke characters.

The following algorithm is preferably used wherein stroke characters are converted into integers:

Step A: Setup

1. Five event values are defined as follows:

north=0, east=1, south=2, west=3, closed=4.

Since these values can be represented in 3 bits each, a shift value is also defined, e.g., shift=3.

2. The sample distance is defined. This value is the minimum distance between position samples for a new sample to be processed by the conversion algorithm.

dest=<some value>

3. The end distance is defined. This value is the maximum distance between the pen down position and the pen up position for a stroke to be considered 'closed'. An example of a closed stroke is the letter 'O' which starts and ends in the same place.

edest=<some value>

Step B. Pen Down

Figure 18:
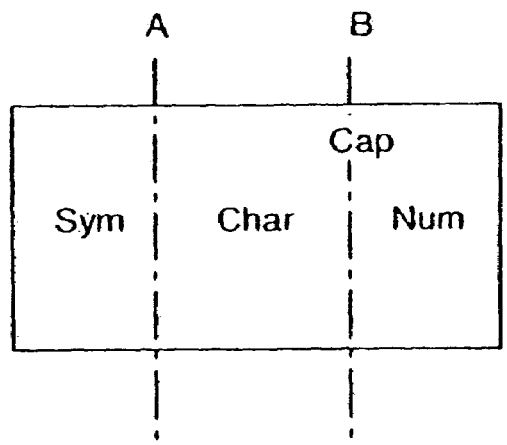
FIG. 18 schematically illustrates defined areas of an input surface of an embedded device for character recognition according to a preferred embodiment.

1. When the pen is pressed we record the initial x,y coordinates in a number of places.
   a. firstx,firsty—are used to remember the start position of the stroke.
   b. lastx,lasty—are used to remember the last x and y values when we generated a new event value
   c. leftx, rightx—are defined with the initial x value. These are later used to deterime which character set to use during final recognition
2. We also reset the north-south and east-west recognition state north-south=unknown, east-west=unknown
3. Set the pattern to zero Step C. Pen Move 1. A large number of pen move events are generated as the pen moves. Each point is analysed as follows
2. if the x position is less the current value of leftx then make leftx equals x
3. if the x position is greater the current value of rightx then make rightx equals x
4. Determine change in north/south motion:
5. If y has moved by more than +dist then we are moving north so set newdir to be north
6. Else if y has move by more than −dist then we are moving south so set newdir to be south
7. Else the change in y is too small to be interesting. Jump to analyse the x value (step 13)
8. If the value of newdir is the same as the value of north-south then we're moving in the same direction as before and don't need to do anything else. Jump to analyse the x value (step 13)
9. If north-south isn't set to unknown set the value of east-west to unknown. This forces the generation of a new east-west event whenever we change our north-south direction
10. Set north-south to the new direction newdir so we don't generate this direction again
11. Set the lasty value to y
12. Add to the recognized pattern as follows pattern=pattern leftshifted-by shift
pattern=pattern bitwise-or newdir 13. Determine change in east/west motion:
14. If x has moved by more than +dist then we are moving east so set newdir to be east
15. Else if x has move by more than −dist then we are moving west so set newdir to be west
16. Else the change in x is too small to be interesting. Jump to the end (step 22)
17. If the value of newdir is the same as the value of east-west then we're moving in the same direction as before and don't need to do anything else. Jump to then end (step 22)
18. If east-west isn't set to unknown set the value of north-south to unknown. This forces the generation of a new north-south event whenever we change our east-west direction
19. Set east-west to the new direction newdir so we don't generate this direction again
20. Set the lastx value to x
21. Add to the recognized pattern as follows pattern=pattern leftshifted-by shift
pattern=pattern bitwise-or newdir 22. Return. We have filted and generated a new pattern based on this movement. We keep building the pattern as long as we move the pen Step D. Pen Up 1. If the distance between x and firstx is less than edist and the distance between y and firsty is also less then edist then we have finished our stroke where we stared it. In this case we add a 'closed' event to the pattern as follows pattern=pattern leftshifted-by shift
pattern=pattern bitwise-or closed 2. For uni-stroke characters we have finished generating a character pattern and must know convert it into a character
3. The writing area looks like the illustration shown at FIG. 18 and is preferably based on the JOT system. It is determined which part of the area was written in to determine which character set to use for recognition.
4. If the leftx value is less then 'A' then we wrote in the SYM area. Set charset to SYM
5. If the leftx value is greater then 'B' then we wrote in the NUM area. Set charset to NUM
6. If the leftx value is less than 'B' and the rightx value is greater than B then we wrote of the 'CAP' line. Set charset to CAP
7. Else set charset to CHAR
8. Within the selected charset look for an exact match for the final pattern value. If one is found return the associated character
9. Otherwise no match is found.

The above algorithm can be extended to recognize multi-stroke characters. To do this, the event 'pen down' is defined which is added to the pattern in the usual way whenever the pen is pressed down. However, to avoid recognition when the pen is released, 'Step D' is triggered on another action rather than 'pen up' as defined for uni-stroke characters. This action can be one of the following:

1. Timeout—the pen can go down and up as many times as required but if it up for more than X milliseconds we consider the character complete and trigger 'Step D'
2. Progressive timeout—when the pen is released, the character is recognized. If recognized, then the character is complete and the algorithm moves onto the next character. If the recognition fails, the addition of new strokes to the pattern are allowed. If the pen is released for X milliseconds and a character is not yet recognized, the algorithm is reset and restarted.

Figure 19:
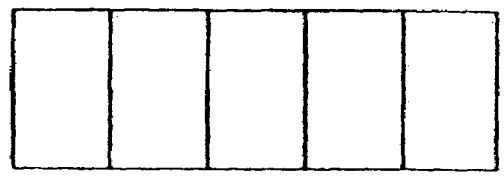
FIG. 19 schematically further illustrates defined areas of an input surface of an embedded device for character recognition according to a preferred embodiment.

Spatial—an area may be defined as illustrated in FIG. 19. A character is written in each box from left to right (or right to left depending on the language). A character is considered complete and trigger 'step D' when the pen is put down in a different box from the last box. Note that this scheme does not allow the separate recognition of symbols, numbers, uppercase letters and lowercase letters. However, all of these may be encoded using multiple stokes making such a scheme unnecessary.

Locking Mechanism

In order to provide a safe multi-threading environment for applications (concurrent execution of several tasks), the preferred embodiment includes an efficient inter-thread synchronization scheme, which is done by means of monitors (guarded sequences of instructions, allowing just a single thread at a time to execute the instructions), and using efficient object locks. Depending on the thread model in use, checking, and updating object locks can be very expensive, since these operations involve atomic instruction sequences which might be implemented as operating system-specific system functions. Advantageously, the locking mechanism according to the preferred embodiment provides testing and setting of the lock in an uninterrupted manner:

```
if object not locked
    /* no context switch allowed here */
    lock object by current thread
```

The scheduler (or thread switching mechanism) is not allowed to switch threads between the lock test and the lock set, which avoids inconsistencies (e.g., object lock held by two different threads). This is achieved at the scheduler level, i.e., is implemented efficiently with user thread systems (wherein the scheduler is part of the application), but can use expensive system calls in case kernel threads are used.

While the probability of colliding lock attempts depends on the nature of executed applications, statistical analysis has shown that in typical applications this probability is less than 0.1, i.e. more than 90% of all locking operations release the lock before another thread tries to get it. However, it is quite common that a lock is recursively obtained/released from within the same thread, as in:

function foo
  lock A
  call bar→function bar
    lock A

This does not block execution in function bar, since the lock at this point already has been acquired by the current thread.

Figure 20:
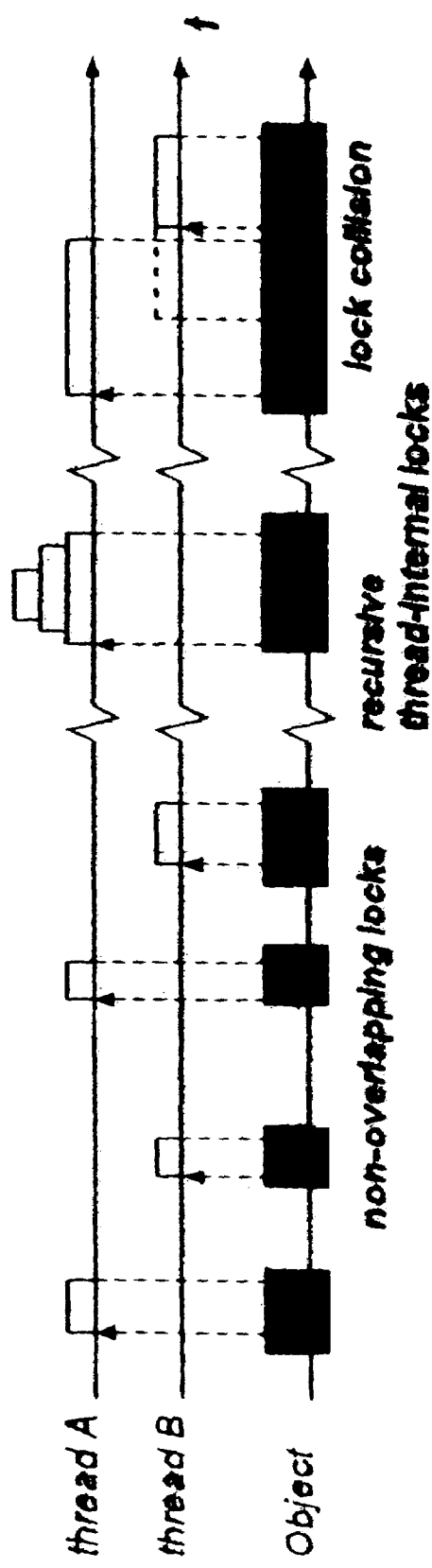
FIG. 20 schematically illustrates different contention locking levels.

The well-separated nature of locking attempts is depicted at FIG. 20. The non-overlapping locks and recursive thread internal locks are deemed un-critical in that not more than one thread tries to obtain the lock at a given time. The lock collision area is the only case which involves a second requestor (thread B) which is blocked on the attempt to acquire the lock, to be re-scheduled once the lock is given up (by thread A).

The locking aspect of this preferred embodiment builds upon this observation to distinguish between heavy and light locks, handling the much more likely light locks (non-overlapping and recursive thread internal locks) in user space, i.e., without the use of expensive system functions, and reverting to system-based heavy locks (lock collision situations) when a potential collision is not recognized as just a thread-internal nested locking attempt.

Figure 21:
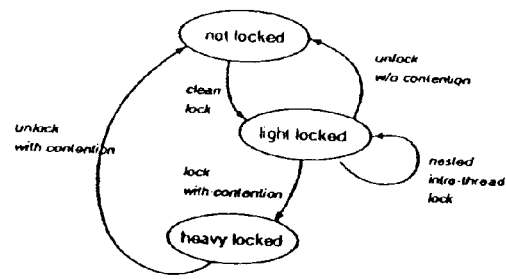
FIG. 21 schematically illustrates relationships between different contention locking levels.

Each object can have one of the lock states depicted in FIG. 21. The first locking attempt puts an unlocked object into the 'light locked' state. If there are subsequent locking attempts from within the same thread, the state doesn't not change. However, if another thread tries to lock a 'light locked' object, the state changes to 'heavy locked'.

Figure 22:
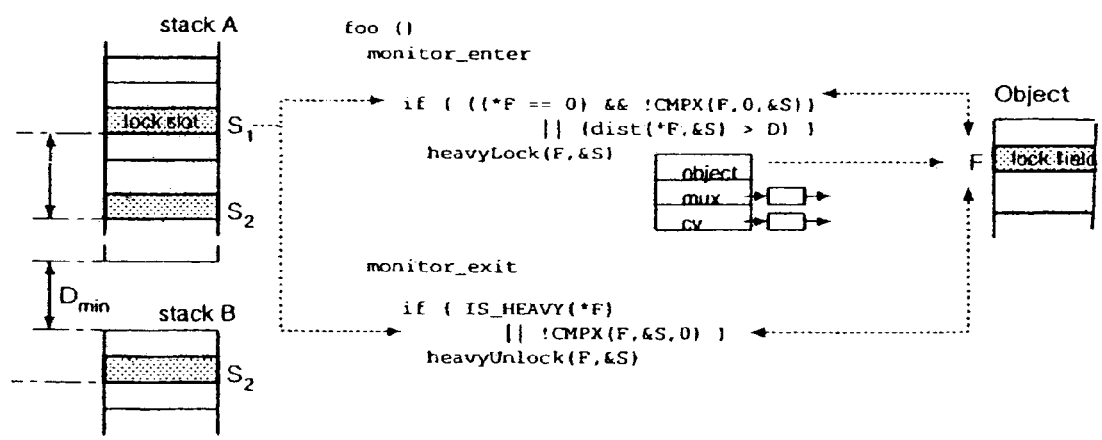
FIG. 22 schematically illustrates a contention locking scheme according to a preferred embodiment.

In order to implement this model, the preferred embodiment uses three advantageous constructs lock structures (containing the lock holder and wait queues)
  stack-based lock slots (local lock structure variable)
  a lock structure reference in each object header Typically, nested intra-thread lock attempts are detected by means of obtaining an identifier of the currently running thread, and to compare it with the one stored in the lock structure. However, obtaining such a thread id can be expensive in itself (especially for kernel thread systems, where it again involves a system call, i.e., requires the measure that the preferred embodiment overcomes by means of the light locks). The preferred embodiment works around this by using addresses of stack variables to identify threads (stacks are per-thread data areas). If a locking attempt of a 'light locked' object detects that the difference $D=S_1-S_2$ between its own lock slot and the address stored in the object lock reference is smaller than a certain threshold (deduced from a reserved area at the end of each stack), this is recognized as a nested intra-thread locking attempt and the object lock is not inflated (i.e., it is not turned into a heavy lock). The feature is illustrated at FIG. 22. While this conservative approach might inflate some locks without need (inside of deeply nested function calls), the vast majority of nested locking attempts is recognized and handled without overhead.

To provide atomic execution of the lock test & set, the preferred embodiment uses a generalized compareAndExchange macro, which is logically defined by

```
compareAndExchange ( address, compareValue,
  newValue ) :==
    if value at address equals compareValue
      set value at address to newValue
      → true
    else
      → false
```

To achieve portability, the preferred embodiment does not assume that the target architecture (CPU) directly supports the compareAndExchange function, and provides implementations for several different atomic machine instructions:
1. COMPARE_AND_EXCHANGE (e.g. cmpxchgl on x86)
2. ATOMIC_EXCHANGE (e.g. swp on ARM)
3. TEST_AND_SET (e.g. tas on SHx)

While implementation with (1) is most straight forward, (2) and (3) involve the use of additional helper variables.

ATOMIC_EXCHANGE uses a stack variable to store the results of the atomic instruction in a thread-safe location

```
COMPARE_AND_EXCHANGE( Lock** a,
Lock* o, Lock* n) ::=
    Lock* val = LOCKINPROGRESS;
    ATOMIC_EXCHANGE(a, val);
    if (val == o)
        *a = n; → true
    else if (val == LOCKINPROGRESS)
        → false
    else
        *a = o; → false
```

The temporary LOCKINPROGRESS value is used to detect concurrent executions of COMPARE_AND_EXCHANGE.

TEST_AND_SET can be used to efficiently implement a global lock

```
COMPARE_AND_EXCHANGE(Lock** a,
Lock* o, Lock* n) ::=
    static int taslock;
    while (TEST_AND_SET(&taslock) == 0);
    if (*a == o)
        *a = n; taslock = 0; → true
    else
        taslock = 0; → false
```

To distinguish between light and heavy locks, the invention makes use of word aligned lock slots and heavy lock objects, setting bit 0 when storing heavy lock addresses in the object lock field.

```
heavyLock(F,adr) ::=
    ..
    lock *lkp = getLockObject(..)
    *F = (lkp | 1)
The IS_HEAVY test macro then simply has
to check for this bit
    IS_HEAVY(F) ::=
        if ( (*F & 1) != 0 )
            →true
        else
            →false
```

With these functions, the lock and unlock operations can be implemented like

```
lock( Lock** lkp, void* where) ::=
    uintp val = (uintp)*lkp;
    if (val == 0)
        if (!COMPARE_AND_EXCHANGE(lkp,
            0, (Lock*)where))
                heavyLock(lkp, where);
```

-continued

```
        else if ((val - (uintp)where) >
            (STACKREDZONE / 2) )
                heavyLock(lkp, where);
        else /* recursive intra-thread lock */
and
    unlock(Lock** lkp, void* where) ::=
        uintp val = (uintp)*lkp;
        if (IS_HEAVY(val))
            heavyUnlock(lkp, where);
        else if (val == (uintp)where &&
    !COMPARE_AND_EXCHANGE(lkp, (iLock*)where,
    LOCKFREE))
            heavyUnlock(lkp, where);
```

In summary, the preferred embodiment uses stack variables, memory alignment (of stack variables and heap objects), and an abstract COMPARE_AND_EXCHANGE instruction to achieve a portable, thread-system neutral, and efficient contention-based lightweight locking scheme.

HTML Correction

The application model according to a preferred embodiment is based on markup language documents, the most common language being HTML. Unfortunately, this language has evolved over more than a decade, with the result that many documents today do not follow a strict grammar, or are simply malformed. Classical examples of malformed HTML are missing end-tags <UL>
<LI>one
<LI>two
</UL> or overlapping tags

<FONT ..>
<TD>one
</FONT>
</TD>

Constructing meaningful documents from such input usually involves a separate parsing step, i.e., generating a memory representation, correcting it, and then writing it back so that it can be further processed/displayed (which again involves a parsing step, with different semantic actions and node types).

The preferred embodiment works around this problem by means of utilizing a recursive descend parsing scheme with token lookahead (mapping grammar productions into recursively called functions), which enables to return from productions based on semantic actions. The following grammar fragment prints semantic actions in bold italics, and uses a EBNF like syntax definition ('{..}' denoting repetitions, '[..]' denoting options, and '|' separating choices).

```
node ::= '<' START_TAG '>'
    {   if (!validNextNode(START_TAG,
            lookAhead(1),lookAhead(2))) return;   (1)
        node [TEXT]
    | '</' END_TAG '>' if (equal(START_TAG,
        END_TAG)) return;   (2)
    }
```

The semantic action (1) is executed before the parser descends into the next 'node' construct, which would be treated as a child of START_TAG.

The preferred embodiment introduces a function validNextNode( ), which is responsible for determining if the following node is either (A) a valid child node or (B) an acceptable end node of START_TAG.

Test (A) can be efficiently implemented by means of a NxN matrix of all valid HTML tags, with '1' elements indicating a valid parent-child relationship. This test would fail for the <LI>..<LI> combination of the first example, bailing out of the first <LI>, then accepting the second <LI> as a valid child of the enclosing <UL>.

Test (B) requires the classification of tags as being 'structural' (like <UL>), or 'attribute' (like <FONT>). Mismatching structural end tags are preferably not accepted, and are returned to their corresponding START_TAG level. Mismatching attribute tags preferably are usually accepted, since they are mainly used for semantic side effects (like setting attribute values for all enclosed "child" nodes). A matching end tag of course returns after consuming all corresponding end tokens (2). With this mechanism, it becomes possible to parse and process HTML documents (showing the above deficiencies) in a single pass.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A computing device executing a graphics rendering software program providing instructions to one or more processors to render graphics on a display, the computing device configured to establish a network connection with at least one other computing device, comprising:
   a graphics driver configured to render a plurality of drawing surfaces, including a first drawing surface and a second drawing surface, on the display, and
   a memory storing graphic objects having a plurality of attributes, wherein attributes from the plurality of attributes are selected from a group consisting of: color and font, wherein each graphic object represents a drawing surface of the plurality of drawing surfaces,
   wherein the graphics driver is configured to render the first drawing surface on the display at least partially overlapping where a portion of the second drawing surface was as a set of rectangular clip segments, wherein when the first drawing surface is rendered as partially overlapping the second drawing surface, the visible portion of the second drawing surface is rendered as the set of rectangular clip segments, wherein the set of rectangular clip segments is selected from a group consisting of: one rectangular clip segment, two rectangular clip segments, three rectangular clip segments and four rectangular clip segments, wherein the plurality of attributes of the graphic objects also includes the set of rectangular clip segments, and
   wherein the graphics driver is configured to determine the second drawing surface comprising the portion of the second drawing surface and the visible portion of the second drawing surface,
   wherein the graphics driver is further configured to increment a visibility tag corresponding to the second drawing surface when the portion of the second drawing surface is to be overlapped by a portion of the first drawing surface, and
   wherein the graphics driver is configured to compute the set of rectangular clip segments if the visibility tag corresponding to the second drawing surface is dissimilar to a visibility tag corresponding to the first drawing surface.

2. The computing device of claim 1, wherein the first drawing surface includes both a visible portion and an obscured portion, wherein the visible portion and the obscured portion both comprise rectangular borders.

3. The computing device of claim 1, wherein each rectangular clip segment of the set of rectangular clip segments is iteratively output to the display for displaying the visible portion of the second drawing surface.

4. The computing device of claim 1, wherein the graphics driver includes:
   (1) a shape function layer including a target architecture specific instruction set setting and retrieving pixel numbers, respectively, into and from a one dimensional frame buffer memory; and
   (2) a framebuffer access macro layer including a set of macros inlining into the shape function layer.

5. The computing device of claim 1 wherein the portion of the second drawing surface is excluded from processing for rendering by the graphics driver.

6. The computing device of claim 1 wherein the plurality of attributes of the graphic objects also includes a clipping region.

7. A computing device executing a graphics rendering software program providing instructions to one or more processors to render graphics on a display computing device configured to establish a network connection with at least one other computing device, comprising:
   a graphics driver configured to render a plurality of drawing surface, including a first drawing surface on a display of the computing device and a second drawing surface on the display of the computing device, and
   a memory storing graphic objects having a plurality of attributes selected from a group consisting of: color, font and clipping region, wherein each of the graphic objects represents a drawing surface of the plurality of drawing surfaces,
   wherein the graphics driver is configured to render the first drawing surface on the display of the computing device at least partially overlapping a region of the second drawing surface on the display of the computing device that was rendered on the display of the computing device,
   wherein, when the first drawing surface is rendered on the display of the computing device as partially overlapping the region of the second drawing surface, a visible portion of the second drawing surface is rendered on the display of the computing device,
   wherein a plurality of attributes for a graphic object representing the second drawing surface also includes a set of rectangular clip segments, wherein the set of rectangular clip segments is selected from a group consisting of: one rectangular clip segment, two rectangular clip segments, three rectangular clip segments and four rectangular clip segments,
   wherein the graphics driver is configured to determine the second drawing surface comprising the portion of the second drawing surface and the visible portion of the second drawing surface,
   wherein the graphics driver is further configured to increment a visibility tag corresponding to the second drawing surface when the portion of the second drawing surface is to be overlapped by a portion of the first drawing surface, and wherein the graphics driver is also configured to compute the set of rectangular clip segments if the visibility tag corresponding to the second drawing surface is dissimilar to a visibility tag corresponding to the first drawing surface.

8. The computing device of claim 7, wherein the first drawing surface comprises a visible portion and an obscured portion, wherein both the visible portion and the obscured portion both comprise rectangular borders.

9. The computing device of claim 7, wherein the graphics driver includes:
   (1) a shape function layer including a target architecture specific instruction set for setting and retrieving pixel numbers, respectively, into and from a one dimensional framebuffer memory; and
   (2) a framebuffer access macro layer including a set of macros inlining into the shape function layer.

10. A computing device executing a graphics rendering software program providing instructions to one or more processors to render graphics on a display, the computing device configured to establish a network connection with at least one other computing device, comprising:
   a graphics driver configured to render a plurality of drawing surfaces, including a first drawing surface and a second drawing surface, on the display, and
   a memory configured to store graphic objects having a plurality of attributes, wherein attributes from the plurality of attributes are selected from a group consisting of: color, font and clip region, wherein each of the graphic objects represents a drawing surface of the plurality of drawing surface,
   wherein the graphics driver is configured to render the first drawing surface at least partially overlapping where a portion of the second drawing surface was rendered on the display, and configured to render a visible portion of the second drawing surface as a set of clip segments, wherein the set of clip segments is selected from a group consisting of: one clip segment, two clip segments, three clip segments and four clip segments,
   wherein, when the first drawing surface is rendered as partially overlapping the second drawing surface, the visible portion of the second drawing surface is rendered as the set of rectangular clip segments,
   wherein the set of clip segments is stored as graphic objects corresponding to the second drawing surface,
   wherein each clip segment of the set of clip segments is iteratively output to the display for displaying the visible portion of the second drawing surface,
   wherein the clip segments are stored as attributes of the graphic objects representing the second drawing surface, and
   wherein the graphics driver is further configured to increment a visibility tag corresponding to the second drawing surface when the portion of the second drawing surface is to be overlapped by a portion of the first drawing surface, and
   wherein the graphics driver is configured to compute the set of clip segments if the visibility tag corresponding to the second drawing surface is dissimilar to a visibility tag corresponding to the first drawing surface.

11. The computing device of claim 10, wherein the graphics driver includes:
   (1) a shape function layer including a target architecture specific instruction set setting and retrieving pixel numbers, respectively, into and from a one dimensional framebuffer memory; and
   (2) a framebuffer access macro layer including a set of macros inlining into the shape function layer.

12. A computing device of claim 10 wherein the clip segments are shaped rectangular.

13. The computing device of claim 12, wherein the first drawing surface comprises a visible portion and an obscured portion, wherein both the visible portion and the obscured portion both comprise rectangular borders.

14. A method of rendering graphics including overlapping drawing surfaces on a display of an embedded computing device configured for establishing a network connection with at least one other computing device, comprising the steps of:
   storing in memory a drawing surface as a graphic object having a plurality of attributes;
   rendering the drawing surface on the display;
   determining a obscured portion of the drawing surface on the display to be obscured by a rendering of a portion of another drawing surface;
   computing a set of clip segments corresponding to a visible portion of the drawing surface, wherein visible portion of the drawing surface comprises portion of the drawing surface excluding the obscured portion of the drawing surface;
   rendering the visible portion of the drawing surface along with the portion of the other drawing surface on the display, and
   incrementing a visibility tag corresponding to the drawing surface when the obscured portion of the second drawing surface is to be overlapped by the portion of the other drawing surface, and
   computing the set of clip segments if the visibility tag corresponding to the partially obscured drawing surface is dissimilar to a visibility tag corresponding to the other drawing surface,
   wherein the set of clip segments are attributes of the graphic object, and
   wherein the set of clip segments is selected from a group consisting of; one clip segment, two clip segments, three clip segments and four clip segments.

15. The method of claim 14, wherein the clip segments correspond to rectangular portions of the visible portion of the drawing surface.

16. The method of claim 15, wherein the drawing surface and the other drawing surface comprise rectangular borders.

17. The method of claim 15, further comprising the step of storing the set of clip segments as the graphics object corresponding to the drawing surface.

18. The method of claim 17, wherein the clip segments correspond to rectangular portions of the visible portion of the drawing surface.

19. The method of claim 18, wherein the drawing surface and the portion of the other drawing surface comprise rectangular borders.

20. The method of claim 17, further comprising the step of iteratively outputting each clip segment of the set of clip segments to the display for displaying the visible portion of the drawing surface.

21. The method of claim 20, wherein the clip segments correspond to rectangular portions of the visible portion of the drawing surface.

22. The method of claim 21, wherein the drawing surface and the portion of the drawing surface comprise rectangular borders.

* * * * *